United States Patent Office 2,848,508
Patented Aug. 19, 1958

2,848,508

PROCESS FOR RECOVERING CAROTENE

Harold M. Barnett, Long Beach, Miner L. Hartmann, Beverly Hills, Rupert C. Mosher, Downey, and Henry M. Espoy, Long Beach, Calif.; said Hartmann, said Mosher and said Espoy assignors to said Barnett No Drawing. Application October 6, 1954
Serial No. 460,756

13 Claims. (Cl. 260—666)

This invention relates to an improved process for recovering carotene, and particularly crystalline carotene, from carrots and other carotene-containing vegetable materials.

Carotene is now an accepted coloring material and source of vitamin A for use in food products, but for such purposes high purity, tasteless crystalline carotene is most acceptable and desired in the trade. The carrot oil, as well as certain impurities including other carotenoid materials have either less desirable flavors or are not sufficiently high in vitamin A potency, to be acceptable in delicately flavored food products such as dairy products, margarine, and shortenings.

One principal object of the invention is to provide an improved process for the recovery of carotene from carrots and other carotene sources. Another object is to provide a process for recovering carotene in substantially pure form from a concentrate containing water, carotene, carotenoids other than carotene, carrot oil and protein materials associated with the carotene and carotenoids in the original vegetable material. Still another object is to provide a process for extracting carotene, other carotenoids and carrot oil from an undried water-dispersed coagulum by means of water-immiscible extracting liquids. Another object is to provide a saturated solution of carotene in the natural carrot oil from carrots, which solution is relatively low in the waxy constituents from carrots from which larger yields of crystalline carotene may be obtained.

It has heretofore been known that the carotene content of pulped fresh vegetables such as carrots, sweet potatoes, yams, squash, and other carotene-containing materials, may be substantially completely removed by elutriation or washing out of the carotene-carrying particles (which are microscopic in size) through a cloth or wire mesh screen on which the thoroughly pulped vegetable materials are placed in a relatively thin layer (for example, see Barnett and Mosher Patent No. 2,408,191 and Barnett Reissue Patent No. 22,629). It is further known that the suspension or emulsion of carotene-containing particles, including the associated protein, vegetable wax and carrot oil, may be coagulated by the use of coagulating agents such as mineral acids or salts so that a coagulum is formed which is separable from excess watery liquid, thus producing a concentration of the carotene of one to fifty fold or more. This coagulum may also be formed from carrot juice or the like into a filterable or separable condition or state by the application of heat, although it is now recognized that the use of temperatures above 70° C. results in some isomerization of the carotene or in the oxidation of carotene, to materials other than the desired alpha and beta carotene.

The coagulum formed in the aqueous mixture obtained by the disintegration and elutriation of the vegetable material, by employing coagulating agents with or without the application of heat, or the coagulum coagulated by heat alone at temperatures above 65° C., when separated as a viscous water colloid mass, is then very difficult to free from water without some loss of carotene, and unless free from water, is most difficult to extract with water-immiscible solvents, such as hexane and similar hydrocarbons.

We have discovered that the colloidal coagulum consisting principally of water, carotene, carotenoids, vegetable wax, carrot oil and protein (which is molecularly associated with the carotene in the carrots), if coagulated in the presence of inert extenders (particularly those having large surface areas such as diatomaceous earth, perlite, vermiculite and the like), gives a material which permits the easy removal of the excess watery liquid or serum by filtration or by draining, following which the surface water can then be removed by mixing in an excess of a solid desiccant in particulate form, such as anhydrous sodium sulfate, anhydrous aluminum oxide, silica gel or the like, and the extended material may then be readily extracted with water-immiscible solvents. We have further discovered that if the wet coagulum is extended with more than enough extender to facilitate the filtration or drainage off of the excess watery liquid, as described above, that less than the fully drying amount of desiccant to dry up all the liquid water may be employed, without adversely affecting the subsequent step of extraction of carotene by water-immiscible solvents. We have further discovered that, by extracting the coagulum without fully drying it, much less of the waxy impurities go into the water-immiscible solvent, which results in more efficient crystallization and separation of crystalline carotene in the subsequent steps of the process.

In order to better illustrate the invention, the following diagram is shown:

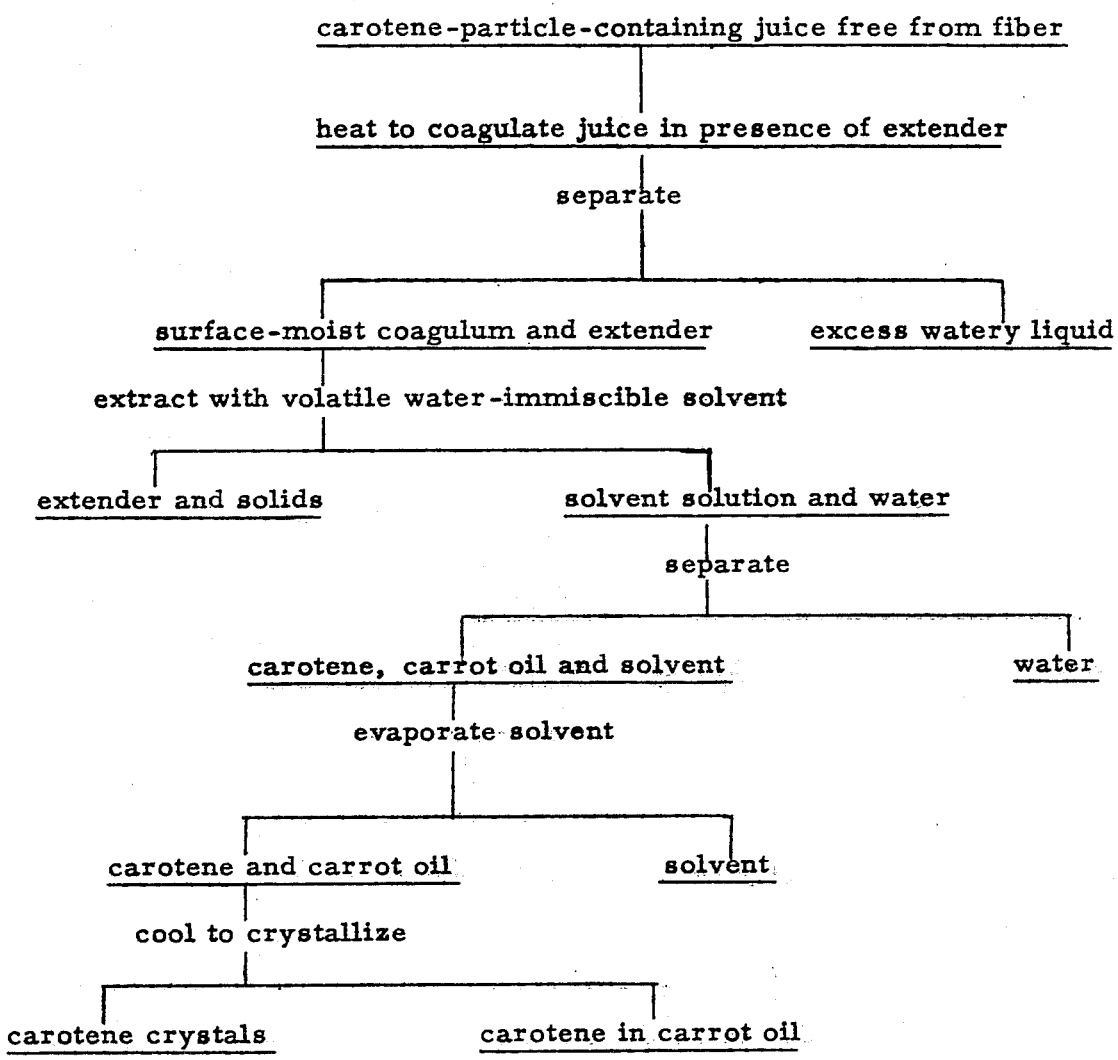

As an illustration of the process of this invention, carrot juice more or less diluted with water or carrot serum (hereinafter referred to as carrot juice) is prepared from carrots by grinding or disintegrating the carrots, followed by squeezing out of the juice by strainers or by centrifugal machines, thus separating out the major portion of the fibrous material from the watery liquid or serum containing suspended carotene-protein particles as they are associated together in the carrots. The carrot juice is then mixed with an inert high surface extender powder such as diatomaceous earth, expanded vermiculite, exploded perlite, or similar materials. The liquid containing the extender material is then heated to preferably about 70° C., being stirred during the heating. This causes the coagulum to form and collect in dispersed condition on the surfaces of the extender particles. The proportion of extender material to moist coagulum may be varied over a large range, but is at least about equal volumes. The solid particles are then removed by decantation or by straining or filtering the mixture to form a moist pulverant solid material. Smaller proportions of extender greatly slow down the draining off of the watery liquid, and unnecessarily large proportions result in more bulk to handle in the subsequent processing.

We prefer to separate the excess liquid from the mixture containing the extender by filtering, using a filter press which has been pre-coated with a layer of the extender, or with a layer of filter aid. One convenient form of filter press for carrying out the operation is a continuous suction drum type filter press which is adapted to rotate partly submerged in a vat of the liquid, a pre-coat of the extender having first been formed upon the drum. As the material is filtered on to the pre-coat layer, it is shaved off by a suitable cutter or knife which produces very thin shavings of the coagulum material distributed on the surfaces of the extender particles, plus some added extender or filter aid from the pre-coat. The added extender material shaved off with the pre-coat prevents the sticking together or coalescing of the coagulum coated particles, and of course, the removal by the shaving off operation of the colloidal coagulum keeps the filter surface open for filtering.

For use in the filter press above described, a small amount of the extender may be originally mixed with the juice before heating, which amount of extender, with that added to the coagulum by the shaving off of the pre-coat, gives a proportion of extender of at least 2 parts by volume of dry extender to one part by volume of moist coagulum. Double or triple this proportion may be used, but the use of unnecessarily excessive proportions of extender merely results in larger amounts of material to subsequently extract and handle.

The coagulum dispersed in or on the extender and the adhering watery liquid is preferably completely or partly dried prior to the solvent extraction of the carotene materials and carrot oil. Low temperature vacuum drying may be employed, but we prefer to mix with the granular coagulum material a desiccating agent such as, for example, anhydrous sodium sulfate, anhydrous silica gel, anhydrous sodium carbonate, or similar solid desiccating materials. For full drying, an amount of the desiccating agent is used which is slightly in excess of the theoretical amount which would be necessary to combine with all of the liquid water which is associated with the coagulum and the extender. We prefer to use anhydrous sodium sulfate, because as it takes up the free water to form sodium sulfate crystals, there is a bulking or fluffing effect which facilitates the subsequent extraction of the carotene materials by solvents. For example, a mixture of extender and coagulum containing about fifty percent of water may be dried by mixing in an approximately equal weight of anhydrous sodium sulfate powder and allowing the mixture to stand for several hours in shallow trays to prevent overheating. This material seems to be dry to the touch and is readily extracted by water-immiscible solvents. This proportion of desiccant which gives a material without apparent surface moisture, and dry to the touch, is hereinafter referred to as "complete drying amount."

Alternatively, less than the complete drying amount of the desiccant may be mixed with the moist mixture of coagulum and extender after the serum has been filtered or drained off, and the carotene materials extracted immediately with hexane solvent or equivalent. For this modification of our invention, it has been found desirable to use relatively more, up to 2 or 3 times as much extender, in relation to the volume of coagulum, as the optimum proportion when the complete drying of the coagulum is effected with solid desiccants as above described. Under these conditions of a high proportion of extender, the material may be extracted without the use of an added desiccant, although the extraction process is slowed down. It is preferred, however, to use from one-tenth to one-half of the complete drying amount of the desiccant agent, such as sodium sulfate, with the moist extended coagulum. The presence of this small proportion of the desiccant, permits the immediate extraction with hexane solvent. In this modification of our invention, about one-fourth of the total extender is added to the juice before coagulation, and the other three-fourths is added as the filter pre-coat, the heated juice liquid containing the coagulum being filtered out on a rotary drum suction filter which has previously been precoated with the extender. The filtered out coagulum is continuously shaved off the surface of the pre-coat layer, including in each cut some of the extender which forms the pre-coat. The filtered out product is moist thin shavings of coagulum dispersed in and on extender particles, the proportion being from 1 to 3 parts by volume to 1 part by volume of moist coagulum. Powdered anhydrous sodium sulfate, in amounts from one-tenth to one-half of the complete drying amount, is mixed with the moist thin shavings, either continuously, or in small accumulated batches, and the mixture immediately immersed in hexane solvent in the extractor vessel. The extraction process is then completed as above described for completely dried coagulum.

When the mixture of coagulum, extender, and moisture is in physical form which allows quick access thereto, as it does in the thin shavings (a few thousandths of an inch in thickness) from the pre-coated drum filter, as above described, we have found that the material may be immediately extracted with water immiscible solvents without any drying. This may be carried out in batches, or by continuous counterflow extraction. This reduces the processing time, saves labor and materials, and decreases loss of the crystallizible carotene due to isomerization and oxidation.

The water immiscible solvent extraction is preferably carried out by use of counter-current procedures, or by the successive recirculation of batches of previously used solvents of decreasing carotene strength. Hexane is the preferred solvent, although others, chlorinated hydrocarbons such as methylene chloride and ethylene dichloride and the like may be used. The most concentrated extraction solution is then withdrawn, and is further concentrated by distilling off the excess solvent under reduced pressure and at as low a temperature as possible, preferably not over 60° C., following which the liquid is chilled and allowed to stand until crystalline beta carotene forms. The crystals are then separated by filtration or decantation, drained, washed, and dried, and consist of substantially pure carotene.

When the solvent extraction step is carried out in the presence of water, that is when no desiccating agent is used, or when less than the full drying amount of desiccant is used, less wax or waxy materials are extracted by the solvent, so that the crystals of carotene form more readily, and in purer condition, and more carotene is recovered as crystals because less solvent is used for washing.

The advantages of our invention are, primarily, the lowering of cost of the production of crystalline carotene, which results from the process steps above described. The steps as described permit the rapid completion of the carotene recovery process from the time of the production of the juice to the start of the crystallization step, thus minimizing the oxidation and isomerization of the carotene which proceeds at increasing rates as the time of processing is increased. Also, our invention permits the processing to be carried out at temperatures lower than those heretofore used, the use of which resulted in rapid oxidation or isomerization. A larger yield of carotene in crystallizable form per ton of carrots results from the improved steps described and hereinafter claimed.

We claim:

1. In the process of recovering carotene from vegetable materials, the steps of preparing carotene-particle-containing juice substantially free from vegetable fiber, adding an inert particulate extender to said juice during coagulation of the carotene materials in said juice to form a coagulum, the proportion of said extender being at least equal in volume to the volume of said moist coagulum, completing the coagulation of the said juice in the presence of said extender, separating the mixture of coagulum and extender from the watery liquid, and extracting the carotene materials from said mixture without heating with a water-immiscible solvent.

2. In the process of recovering carotene from vegetable materials, the steps of preparing a carotene-particle-containing juice substantially free from fiber, adding an inert particulate extender to said juice during coagulation of the carotene materials in said juice to form a coagulum, the proportion of said extender being at least equal in volume to the volume of said moist coagulum, completing the coagulation of said juice in the presence of said extender, separating the coagulum and extender from the excess watery liquid leaving the mixture of coagulum and extender in surface-moist condition, extracting the carotene material from said surface-moist mixture without heating with a volatile water-immiscible solvent, separating out the liquid water from said solvent solution of carotene materials, and removing said volatile solvent from said carotene materials.

3. In the process of recovering carotene from carrots, the steps of preparing a carotene-particle-containing juice substantially free from fiber, adding an inert particulate extender to said juice during coagulation of the carotene materials in said juice to form a coagulum, the proportion of said extender being at least equal in volume to the volume of said moist coagulum, completing the coagulation of said juice in the presence of said extender, separating the moist coagulum and extender from the watery liquid, extracting the carotene materials from said mixture without heating with a volatile water-immiscible solvent, and removing said volatile solvent.

4. In the process of recovering carotene from vegetable materials, the steps of preparing a carotene-particle-containing juice substantially free from fiber, adding an inert particulate extender to said juice during coagulation of the carotene materials in said juice to form a coagulum, the proportion of said extender being at least equal in volume to the volume of said moist coagulum, completing the coagulation of said juice in the presence of said extender, separating the coagulum and extender from the watery liquid, partly drying the surface moisture from said coagulum and extender, extracting the carotene materials from said partly dried mixture without heating with a volatile water-immiscible solvent, and removing said volatile solvent.

5. In the process of recovering carotene from vegetable materials, the steps of preparing a carotene-particle-containing juice substantially free from fiber, adding a particulate mineral extender to said juice to form a coagulum, the proportion of said extender being at least equal in volume to the volume of said moist coagulum, coagulating said juice in the presence of said extender, separating the coagulum and extender from the watery liquid, mixing said coagulum and contained extender with an additional amount of extender, partly drying the surface moisture from said coagulum and the contained extender, extracting the carotene materials and carrot oil from said partly dried mixture with a volatile water-immiscible solvent, and removing said volatile solvent.

6. In the process of recovering carotene from vegetable materials, the steps of preparing a carotene-particle-containing juice substantially free from fiber, adding a mineral extender powder to said juice, coagulating said juice in the presence of said extender, separating the coagulum and extender from the watery liquid, the total amount of extender being at least equal in volume to said moist coagulum, mixing said coagulum and contained extender, with a solid desiccating powder in an amount sufficient to take up only a fraction of the surface moisture, and extracting the carotene materials from said partly dried mixture of coagulum, extender, and desiccating powder without heating with a volatile water-immiscible solvent.

7. In the process of recovering carotene from vegetable materials the steps of preparing a carotene-particle-containing juice substantially free from fiber, adding a mineral extender powder to said juice, coagulating said juice in the presence of said extender, separating the coagulum and extender from the watery liquid, mixing said coagulum and contained extender with an additional amount of extender, the total amount of extender being at least equal in volume to said moist coagulum, mixing said coagulum and contained extender, and the added extender, with a solid desiccating powder in an amount equal to a fraction of the complete drying amount, and immediately extracting the carotene materials from said mixture of coagulum, extender, and desiccating powder without heating with a volatile water-immiscible solvent.

8. In the process of recovering carotene from carrots, the steps of preparing a carrot juice substantially free from carrot fiber, adding a mineral extender powder to said juice in an amount sufficient to produce a filterable mixture after coagulation of said juice, coagulating said carrot juice in the presence of said extender, separating the coagulum and extender from the watery liquid, mixing said coagulum and contained extender with an additional amount of extender in an amount sufficient to prevent sticking together of the particles of said mixture, and immediately extracting the carotene materials and carrot oil from said moist mixture without heating with a volatile water-immiscible solvent.

9. In the process of recovering carotene from carrots, the steps of coagulating a carrot juice to form a moist coagulum in the presence of a large excess of an inert high surface extender powder, the proportion by volume of said extender powder being at least equal to the volume of said moist coagulum, separating the moist solid extender powder and contained coagulum from the watery liquid, and immediately extracting the carotene materials and carrot oil without heating from said moist mixture of coagulum and extender with a volatile water-immiscible solvent.

10. In the process of recovering carotene from a water-dispersed coagulum containing carotene associated with oil and protein materials, the steps of mixing at least an equal volume of a high surface mineral extender with said coagulum, and extracting the moist mixture without heating with a volatile water-immiscible solvent to remove the carotene and oil.

11. In the process of forming carotene crystals from carrot oil, the steps of mixing a moist concentrate from fresh carrots containing carotene, carrot oil, vegetable wax, and associated protein with sufficient inert high surface extender particles to facilitate quick surface contact by a carotene solvent, the volume of said extender particles being not less than the volume of said moist concentrate, extracting said mixture with hexane to remove said carotene, carrot oil, and only a small proportion of said wax, removing said hexane, cooling the residual saturated solution of carotene in carrot oil until carotene crystals form, and separating said crystals from said oil.

12. In the process of recovering carotene from a water-dispersed coagulum containing carotene associated with oil and protein materials, the steps of mixing at least an equal volume of a high surface mineral extender with said coagulum whereby to form a dispersed substantially granular material, mixing said moist granular material with a volatile water-immiscible carotene solvent, and separating out said solvent and dissolved carotene materials.

13. In the process of recovering carotene from carrots and the like, in which a water-dispersed coagulum carotene concentrate is produced, the steps of extracting said concentrate with a volatile water-immiscible carotene solvent in the presence of the free water of said coagulum concentrate, whereby to substantially avoid the extraction of the natural waxy materials contained in said coagulum concentrate.

References Cited in the file of this patent

UNITED STATES PATENTS

| | | |
|---|---|---|
| 2,032,006 | Cross | Feb. 25, 1936 |
| 2,383,561 | Petering et al. | Aug. 28, 1945 |
| 2,412,707 | Barnett | Dec. 17, 1946 |
| 2,432,021 | Larner | Dec. 2, 1947 |
| 2,567,362 | Berkman et al. | Sept. 11, 1951 |
| 2,632,012 | Boldingh | Mar. 17, 1953 |
| 2,739,145 | Barnett | Mar. 20, 1956 |
| 2,799,588 | Todd | July 16, 1957 |

OTHER REFERENCES

Petering et al.: Industrial & Engineering Chemistry, vol. 32, pages 1407–1412, October 1940 (page 1409 only relied on).